United States Patent [19]

Yoshiba

[11] 4,350,013

[45] Sep. 21, 1982

[54] EXHAUST GAS RECIRCULATION SYSTEM

[75] Inventor: Yasutaka Yoshiba, Chiba, Japan

[73] Assignee: Nissan Motor Company, Limited, Yokohama, Japan

[21] Appl. No.: 116,641

[22] Filed: Jan. 29, 1980

[30] Foreign Application Priority Data

Feb. 9, 1979 [JP] Japan .................. 54-15492[U]

[51] Int. Cl.³ .................. F02B 37/00; F02M 25/06
[52] U.S. Cl. ........................................ 60/605; 123/569
[58] Field of Search .................. 60/605; 123/568, 569, 123/570

[56] References Cited

U.S. PATENT DOCUMENTS

| | | | |
|---|---|---|---|
| 3,149,454 | 9/1964 | Hahn | 60/605 X |
| 3,237,615 | 3/1966 | Daigh | 123/570 |
| 4,088,101 | 5/1978 | Wakita | 123/568 |

FOREIGN PATENT DOCUMENTS 1917259 10/1969 Fed. Rep. of Germany ........ 60/605

54-12041 1/1979 Japan ........................................ 60/605
54-148927 11/1979 Japan ........................................ 123/569

Primary Examiner—Michael Koczo, Jr.
Attorney, Agent, or Firm—Thompson, Birch, Gauthier & Samuels

[57] ABSTRACT

In a diesel engine having a turbocharger for feeding supercharged air to the engine, an exhaust gas recirculation passage communicates between the exhaust passage from the engine and the intake passage to a compressor of the turbocharger. A first control valve closes the exhaust gas recirculation passage when the output pressure of the air leading from the compressor is lower than a first predetermined value or higher than a second predetermined value which is higher than the first predetermined value. A second control valve may be further provided within the exhaust gas recirculation passage so as to close the exhaust gas recirculation passage when the load applied to the engine is above a predetermined value.

5 Claims, 4 Drawing Figures

EXHAUST GAS RECIRCULATION SYSTEM

BACKGROUND OF THE INVENTION

The present invention relates to a diesel engine with a turbocharge and particularly to an exhaust gas recirculation system in such engine.

Such an exhaust gas recirculation system has been used in order to cope with the exhaust gas discharged from a diesel engine and particularly to decrease the amount of oxides of nitrogen ($NO_x$) discharged from the engine by suppressing an increase in the temperature of the engine.

One conventional exhaust gas recirculation system of the above type is shown in FIG. 1 of the drawings. In this system, generally designated by reference numeral 10, when a diesel engine 12 is operating at a relatively low speed, the flow rate of air supplied from a compressor 14 of a supercharger 16 through an inlet pipe 18 to the diesel engine 12 is low and thus the supercharged pressure from the compressor 14 is low. This supercharged pressure is supplied through a pipe 20 to a chamber 22 of a valve actuating device 24 formed by partitioning a housing 26 with a diaphragm 28. The exhaust gas pressure of the engine 12 is introduced through an exhaust pipe 30 to a turbine 32 of the supercharger 16 and through a recirculation passage 34 to the other chamber 36 in the housing 26. If the pressure, designated by $P_1$, inside the chamber 22 is lower than the pressure, designated by $P_2$, inside the chamber 36, a valve rod 38 connected at one end to the diaphragm 28 is moved by a return spring 40 within the chamber 36 and the pressure $P_2$ to close a valve member 42 formed on the rod 38 against an outlet 44 of a valve casing 46 constituting together with the valve rod 38 a valve 41 thereby reducing the flow rate $F_g$ of exhaust gas flowing from the recirculation passage 34 through an inlet 48 and the valve casing 46 to the outlet 44 and hence recirculated through the recirculation passage 34 to an intake passage 50 to the compressor 14. If the exhaust gas pressure from the engine 12 increases and the flow of intake air to the engine 12 does not change, the pressure $P_2$ at the inlet 48 will increase thereby initially increasing the amount of exhaust gas recirculated. However, the pressure $P_2$ within the chamber 36 also increases, which causes the valve rod 38 to move in the direction of closing the valve member 42 against the outlet 44 thereby reducing $F_g$. In the same way, when $P_2$ decreases, the valve member 42 is moved away from the outlet 44 so as to increase $F_g$. Reference numeral 33 denotes an exhaust passage from the turbine 32.

When the engine 12 operates at a relatively high speed, the flow of intake air to the engine 12 and the pressure in the intake pipe 18 increase. This causes the pressure $P_1$ in the chamber 22 to increase compared with the pressure $P_2$ in the chamber 36 with the result that the rod 38 is moved by the diaphragm 28 against the return spring 40 in the direction of moving the valve member 42 away from the outlet 44. Thus the flow $F_g$ of recirculated exhaust gas increases in proportion to the amount of intake air to the engine, irrespective of fluctuations in the exhaust gas pressure from the engine. According to this system, the amount of $NO_x$ contained in the exhaust gas is highly reduced. However, in order to improve the operation and output power of the engine, for economy of fuel consumption and to prevent the generation of smoke, the flow rate of recirculated exhaust gas should preferably be as low as possible.

When the engine load is relatively low, the amount of $NO_x$ produced is small and recirculation of exhaust gas is substantially unnecessary; it should rather be avoided in view of a possiblity of the engine's stopping. On the other hand, when the engine load is relatively high, the recirculation of exhaust gas should be avoided because high output power and low fuel consumption are required of the engine.

SUMMARY OF THE INVENTION

It is therefore an object of the present invention to provide an exhaust gas recirculation system for a diesel engine having a turbocharger, which effects a recirculation of part of the exhaust gas to the inlet of the compressor except in the ranges of relatively high and low engine speeds.

Another object of the present invention is to provide an exhaust gas recirculation system for a diesel engine having a turbocharger, wherein the part of the exhaust gas recirculated to the inlet of the compressor is proportional to the difference between the engine exhaust pressure and the compressor intake air pressure.

According to the present invention, there is provided in a diesel engine having a turbocharger which has a compressor for supplying compressed air to the engine and a turbine driven by exhaust gas from the engine for rotating the compressor, an exhaust gas recirculation system comprising:

a recirculation passage connecting the exhaust side of the engine and the intake side of the compressor; and a control valve disposed within the recirculation passage, and responsive to the output pressure from the compressor in such manner as to close the recirculation passage when the output pressure is lower than a first predetermined value or higher than a second predetermined value which is higher than the first predetermined value.

A second control valve may be provided in the recirculation passage in order to close the same and to prevent the production of smoke in the exhaust gas and a decrease in the output power of the engine when high output power and low fuel consumption are required.

BRIEF DESCRIPTION OF THE DRAWINGS

Other objects, features and advantages of the present invention will become more fully understood with reference to the following description of a preferred embodiment thereof, and with reference to the attached drawings, which, however, are not to be taken as limiting the present invention in any way, but are given for the purposes of illustration and elucidation only. In the drawings.

DETAILED DESCRIPTION OF THE PREFERRED EMBODIMENTS

Figure 1:
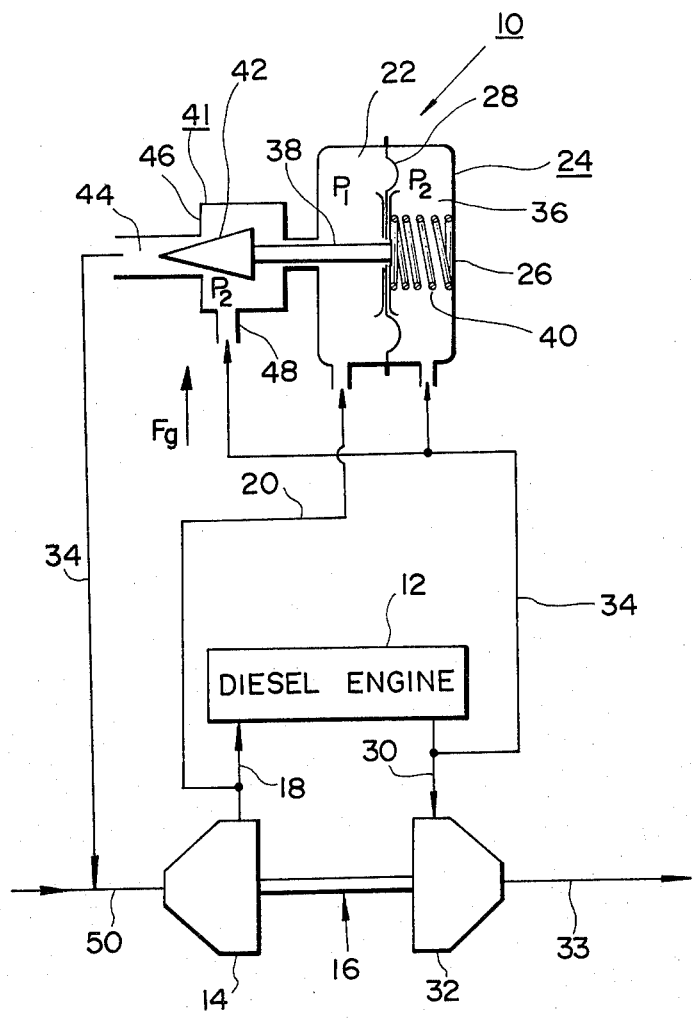
FIG. 1 is a schematic view of a prior art exhaust gas recirculation system which has a diesel engine with a supercharger.

The same reference numeral designates a corresponding or similar part through the drawings.

Figure 2:
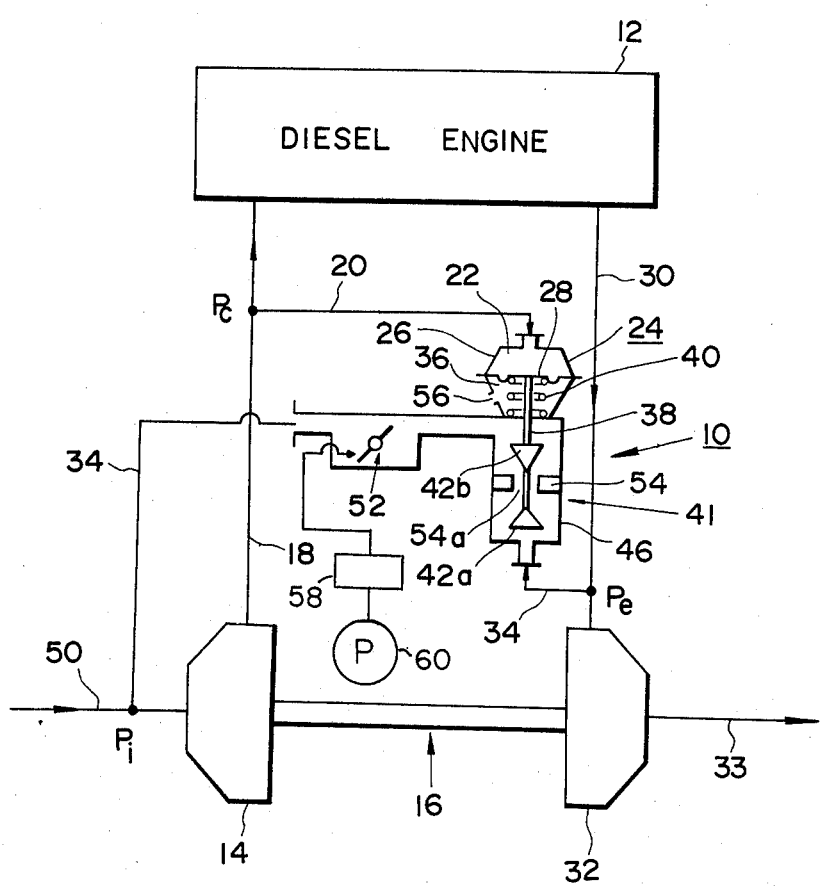
FIG. 2 is a view, similar to FIG. 1, of a preferred embodiment of an exhaust gas recirculation system according to the present invention which has a diesel engine with a turbocharger.

Referring to FIG. 2, a preferred embodiment of an exhaust gas recirculation system according to the present invention, generally designated by 10, is shown which has a diesel engine 12 with a turbocharger 16. A compressor 14 of the turbocharger 16 draws in air from an air cleaner, not shown, through an intake passage 50 and supplies compressed air through an inlet pipe 18 to the engine 12. A turbine 32 of the turbocharger 16 is rotated by the pressure of the exhaust gas from the engine through an exhaust pipe 30 thereby driving the compressor 14 which is coaxially coupled directly to the turbine 32.

The exhaust gas recirculation system 10 is provided with a recirculation passage 34 which communicates with the intake side of the compressor 14 through intake passage 50, and with the inlet side of the turbine 32 through the exhaust pipe 30. The recirculation passage 34 contains first and second control valves 41 and 52. The first control valve 41 includes a rod 38 having a portion extending within the casing 46 through the end wall thereof, two axially spaced conical valve members 42a and 42b formed integrally with the rod and a passage limiter 54, which may be in the form of a disc with a through passage 54a at the center thereof, disposed between the two conical valve members and secured to the inside of the casing 46. A valve actuating device 24 is provided with a housing 26 secured to the valve casing 46 and is partitioned by a diaphragm 28 into chambers 22 and 36. One chamber 22 communicates through a pipe 20 with the outlet side of the compressor 14 while the other chamber 36 communicates through an opening 56 with the atmosphere. The chamber 36 contains a spiral return spring 40 coaxial with the portion of the rod 38 within the casing 46. The diaphragm 28 is secured to the end of the rod portion outside the casing 46. Thus, output pressure Pc of air which passes from the compressor 14 and which exerts downward pressure on the diaphragm 28 is lower than a predetermined value $P_1$, the diaphragm 28, and therefore the rod 38 will be moved upwards in the figure by the spring 40, thereby causing the valve member 42a to close the passage 54a in the passage limiter 54. On the other hand, if the pressure Pc is higher than another predetermined value $P_2$ which is higher than $P_1$, the diaphragm 28 and therefore the rod 38 will be moved downwards in the figure thereby causing the valve member 42b to close the passage 54a.

The second control valve 52, which is a butterfly valve, is arranged to operate in response to a sensor 58 which monitors the fuel flow rate of a fuel injection pump 60, and to close the recirculation passage 34 when the engine load is relatively high.

Figure 3:
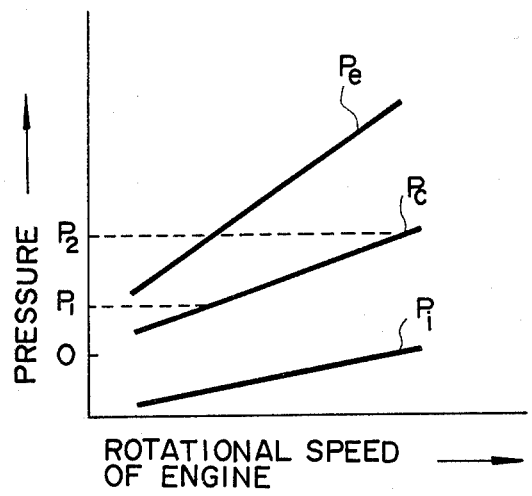
FIG. 3 is a graph showing the relationship between the rotational speed of the diesel engine and the input and output pressures of an compressor of the turbocharger, and the discharge pressure from the diesel engine in FIG. 2.

In operation, the intake pressure Pi and the output pressure Pc of the compressor 14 and the discharge pressure Pe from the engine increase, as shown in FIG. 3, according to the rotational speed of the turbocharger 16 which is substantially proportional to the rotational speed of the diesel engine 12. As the engine 12 operates and produces an exhaust pressure Pe which rotates the turbocharger 16, a differential pressure (Pe−Pi) proportional to the rotational speed of the engine 12 is produced between the inlet and the outlet of the recirculation passage 34. Part of the exhaust gas from the engine 12, proportional in amount to the differential pressure, is returned to the intake passage 50 of the compressor 14 when the control valves 41 and 52 are open, and is drawn into the combustion chamber, not shown, of the engine 12 along with fresh air thereby preventing the production of $NO_x$ during combustion.

Figure 4:
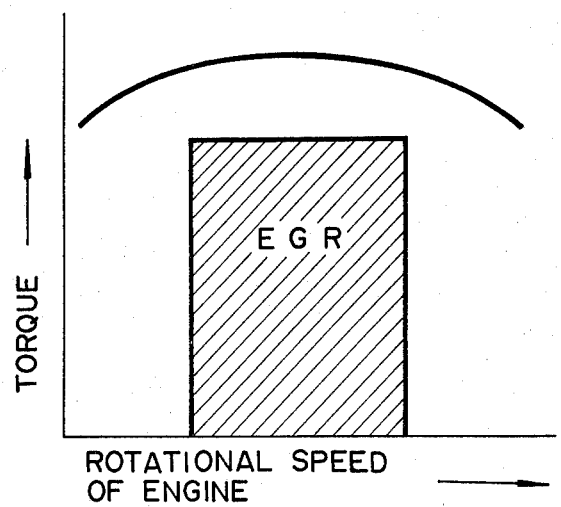
FIG. 4 is a graph showing the relationship between the rotational speed and torque of the diesel engine, and the operational area of the exhaust gas recirculation system of FIG. 2.

The first control valve 41 responds to the output pressure Pc from the compressor 14. When the rotational speed of the engine 12 is relatively low and therefore the output pressure Pc is lower than the predetermined value $P_1$, the valve member 42a closes the passage 54a in the passage limiter 54, while when the rotational speed of the engine 12 is relatively high and therefore the output pressure Pc is higher than the predetermined value $P_2$ which is higher than $P_1$, the valve member 42b closes the passage 54a in the passage limiter 54. Thus as seen in FIG. 4, in the areas of high and low engine speeds, the recirculation of exhaust gas is prevented and, in the intermediate area, shown by hatching, of the rotational speed of the engine, the recirculation of the exhaust gas is carried out.

In a diesel engine, the amount of intake air is directly proportional to the rotational speed of the engine while the output power of the engine is controlled by the amount of fuel injected into the engine. Thus as the amount of fuel injected increases, the output power (torque) increases although the rotational speed of the engine is constant. It follows that, as the torque increases at the same engine speed, the excess of air and the percentage of oxygen in the exhaust gas relatively decrease. Thus the concentration of oxygen in the exhaust gas recirculated to the intake air decreases as the torque (load) increases whereas the amount of $NO_x$ produced increases as the load increases. The actual rate of exhaust gas recirculation effective for suppression of $NO_x$ generation increases with an increase in the load, but the exhaust gas recirculation ratio, which is the volume ratio of the flow rate of intake air to the engine to the flow rate of recirculated exhaust gas is constant irrespective of the load applied to the engine.

The second control valve 52 closes the passage 34 in the area of a relatively high load, and therefore under the operational conditions where relatively high output power is required, the recirculation of exhaust gas is stopped so as to prevent the production of smoke and a decrease in the maximum output power.

Although the present invention has been shown and described with reference to a preferred embodiment, it should not be considered as limited to this, however, or to other detailed embodiments. Yet further modifications to the form and the content of the particular embodiment could be made, without departing from the scope of the present invention, which it is therefore desired should be defined not by any of the details of the shown embodiment, or of the drawings, but solely by the appended claims.

What is claimed:

1. In a diesel engine having a turbocharger which includes a compressor for supplying compressed air to the engine, and which includes a turbine driven by exhaust gas from the engine for rotating the compressor, an exhaust gas recirculation system comprising:

a recirculation passage connecting the exhaust side of the engine and the intake side of the compressor for carrying the exhaust gas from the engine to the compressor;

a control valve disposed within said recirculation passage; and valve actuating means associated with said valve for sensing compressor output pressure and for causing said control valve to close said recirculation passage when the sensed compressor output pressure is lower than a first predetermined value, and when the sensed compressor output pressure is higher than a second predetermined value, the second predetermined value being higher than the first predetermined value.

2. The exhaust gas recirculation system of claim 1, wherein said control valve includes a casing, an axially movable rod having a portion extending into said casing, two valve members disposed in axially spaced relation on the portion of said rod within said casing, a passage limiter disposed within said casing between said two valve members, said passage limiter being contacted by one said valve member as said rod moves axially in one direction, and by the other said valve member as said rod moves axially in the other direction, the contact between each said valve member and said passage limiter closing said recirculation passage, and wherein said valve actuating means is associated with said rod and causes said rod to move one of said valve members into contact with said passage limiter upon sensing that compressor output pressure is lower than the first predetermined value, and causes said rod to move the other one of said valve members into contact with said passage limiter upon sensing that compressor output pressure is higher than the second predetermined value.

3. The exhaust gas recirculation system of claim 2, wherein said valve actuating means includes a housing, a diaphragm attached to said rod and partitioning the interior of said housing into two chambers, the first housing chamber communicating with the output side of said compressor, the second housing chamber being maintained at a substantially constant pressure value, and spring means urging said diaphragm towards the first housing chamber.

4. The exhaust gas recirculation system of claims 1 or 2 or 3, further including a second control valve disposed within said recirculation passage, and second valve actuating means associated with said second control valve for sensing engine load condition and for causing said second control valve to close said recirculation passage when the sensed engine load condition value is higher than a predetermined value.

5. The exhaust gas recirculation system of claim 4, wherein said second control valve is a butterfly valve.

* * * * *